United States Patent
Wei et al.

(10) Patent No.: US 8,037,348 B2
(45) Date of Patent: Oct. 11, 2011

(54) VIBRATION-AWARE DATA REASSIGNMENT

(75) Inventors: Bo Wei, Singapore (SG); HuaYuan Chen, Singapore (SG); Steven TianChye Cheok, Singapore (SG); JinQuan Shen, Singapore (SG)

(73) Assignee: Seagate Technologies LLC, Cupertino, CA (US)

( * ) Notice: Subject to any disclaimer, the term of this patent is extended or adjusted under 35 U.S.C. 154(b) by 688 days.

(21) Appl. No.: 11/962,270

(22) Filed: Dec. 21, 2007

(65) Prior Publication Data

US 2009/0164843 A1 Jun. 25, 2009

(51) Int. Cl.
*G06F 11/00* (2006.01)
*G06F 11/20* (2006.01)

(52) U.S. Cl. ............ 714/6.3; 360/31; 714/6.2; 714/6.32

(58) Field of Classification Search ............... 369/247.1; 720/651; 714/18, 6.2, 6.3, 6.32; 360/31
See application file for complete search history.

(56) References Cited

U.S. PATENT DOCUMENTS

| | | | | |
|---|---|---|---|---|
| 5,130,969 | A | 7/1992 | Sako | 369/58 |
| 5,493,676 | A * | 2/1996 | Amundson | 714/42 |
| 5,710,943 | A * | 1/1998 | Burton et al. | 710/52 |
| 5,857,059 | A * | 1/1999 | Yamagishi | 386/125 |
| 5,872,905 | A | 2/1999 | Ono et al. | 395/182.03 |
| 5,918,001 | A | 6/1999 | Ueno et al. | 395/182.06 |
| 6,034,831 | A | 3/2000 | Dobbek et al. | 360/53 |
| 6,078,452 | A | 6/2000 | Kittilson et al. | 360/51 |
| 6,098,185 | A | 8/2000 | Wilson | 714/710 |
| 6,223,303 | B1 | 4/2001 | Billings et al. | 714/8 |
| 6,282,670 | B1 | 8/2001 | Islam et al. | 714/6 |
| 6,442,715 | B1 * | 8/2002 | Wilson | 714/710 |
| 6,490,691 | B1 | 12/2002 | Kimura et al. | 714/42 |
| 6,530,034 | B1 | 3/2003 | Okada et al. | 714/5 |
| 6,545,833 | B1 | 4/2003 | Ee et al. | 360/53 |
| 6,557,141 | B1 | 4/2003 | Gill et al. | |
| 6,574,699 | B1 | 6/2003 | Dobbek | 711/4 |
| 6,654,193 | B1 | 11/2003 | Thelin | 360/53 |
| 6,711,628 | B1 | 3/2004 | Thelin | 277/38 |
| 6,728,060 | B1 | 4/2004 | Chng et al. | 360/77.01 |
| 6,898,036 | B2 | 5/2005 | Gill et al. | |
| 6,995,943 | B1 * | 2/2006 | Shrestha et al. | 360/77.08 |
| 7,047,438 | B2 | 5/2006 | Smith et al. | 714/8 |
| 7,051,154 | B1 | 5/2006 | Chng et al. | 711/113 |
| 7,304,816 | B2 * | 12/2007 | Johnson et al. | 360/31 |
| 7,468,857 | B2 * | 12/2008 | Hutsell et al. | 360/77.03 |
| 7,490,263 | B2 | 2/2009 | King | |
| 7,627,778 | B2 * | 12/2009 | Chen et al. | 714/8 |
| 7,656,599 | B2 * | 2/2010 | Abe et al. | 360/31 |
| 7,697,226 | B2 * | 4/2010 | Abe et al. | 360/53 |

(Continued)

OTHER PUBLICATIONS

U.S. Appl. No. 11/614,780, Prediction-Based Data Reassignment, filed Dec. 21, 2006.

*Primary Examiner* — Joseph Schell

(74) *Attorney, Agent, or Firm* — Westman, Champlin & Kelly, P.A.

(57) ABSTRACT

An aspect of the present disclosure relates to implementing a temporary reassignment of data based on a vibration condition. An exemplary method includes implementing a data operation for a portion of data and detecting a data error during the data operation. The method further includes obtaining an indication of a vibration condition associated with a device with which the data operation is performed and implementing a temporary reassignment of the portion of data based on the vibration condition.

19 Claims, 8 Drawing Sheets

U.S. PATENT DOCUMENTS

| | | |
|---|---|---|
| 2003/0028841 A1 | 2/2003 | Rushton et al. |
| 2005/0213446 A1* | 9/2005 | Tanaka et al. ............... 369/47.4 |
| 2006/0171057 A1 | 8/2006 | Lee ................................. 714/8 |
| 2006/0215307 A1* | 9/2006 | Yoshida et al. ................ 360/75 |
| 2007/0070542 A1 | 3/2007 | Suzuki et al. .............. 360/97.02 |
| 2008/0189578 A1* | 8/2008 | Raghuraman et al. .......... 714/47 |

\* cited by examiner

VIBRATION-AWARE DATA REASSIGNMENT

BACKGROUND

The present disclosure relates generally to data storage systems, and more particularly, but not by limitation, to data reassignment in data storage systems.

Data storage systems are used in a variety of different applications. Many different types of data storage systems exist, such as solid-state and non-solid state systems. Flash memory, random access memory (RAM), and dynamic random access memory (DRAM) are examples of solid-state data storage systems. Further, a disc drive is an example of a type of non-solid state storage system. A disc drive includes at least one rotating disc or storage medium for storage of digital information in a plurality of circular, concentric data tracks. Further, the data tracks (or similarly groups of locations in a solid state device) can be divided into a plurality of data sectors. The storage medium passes under a respective bearing slider surface. Each slider carries one or more transducers, which writes information to and reads information from the data surfaces of the disc(s). The slider and transducers are often together referred to as a "head."

In some instances, one or more sectors of the storage medium can become defective. For example, it sometimes happens that sectors of a storage medium become defective during the manufacturing process of the storage medium. Further, in some instances sectors can become defective during normal operation. Defects can arise in any of the data sectors at various times during the lifetime of the storage system (grown defects). For a disc drive, grown defects include, for example, invading foreign particles which become embedded onto a surface of the storage medium, or external shocks to the storage system which can cause the transducer to nick or crash onto a surface of the storage medium. Defective data sectors pose either temporary or permanent data retrieval problems. To accommodate media defects such as grown defects, a number of spare sectors can be provided on the storage medium. The spare sectors are used to replace defective sectors on the storage medium.

In many embodiments, a data storage system is subjected to momentary shock and/or vibration which can cause data errors, for example during a data write and/or read operation. For example, data storage systems, such as disc drives, are recently being used to a greater extent in hand-held consumer electronics, such as digital music players, cell phones and personal data assistants. A disc drive in a hand-held device can undergo frequent shock events, such as accidental drops. In addition, some hand-held devices themselves are active shock generators. For example, a hand-held phone set on a vibration mode causes momentary shock events during vibration. Even a ring tone on a hand-held phone can provide a source of momentary shock if the volume is set high enough.

The discussion above is merely provided for general background information and is not intended to be used as an aid in determining the scope of the claimed subject matter.

SUMMARY

An aspect of the present disclosure relates to performing a data operation in a data storage system. A temporary data reassignment is performed for a portion of data based on a vibration condition of the data storage system.

One exemplary aspect relates to a method of performing a data operation. The method includes implementing a data operation for a portion of data and detecting a data error during the data operation. The method further includes obtaining an indication of a vibration condition associated with a device with which the data operation is performed and implementing a temporary reassignment of the portion of data based on the vibration condition.

Another exemplary aspect relates to a data storage system, which includes a target storage medium, a temporary data storage location, and a vibration detection component. A controller is configured to implement a data write operation of a portion of data to the target storage medium and detect a data error during the write operation. The controller is further configured to receive a signal from the vibration detection component indicative of a vibration condition during the write operation and implement a temporary reassignment of data to the temporary data storage location based on the vibration condition.

Another exemplary aspect relates to a method that includes detecting a data error during a data operation and obtaining a vibration status from a vibration detection component. Further, in response to the detected data error, and based on the vibration status, the data operation is either retried or the data operation is reassigned. In response to retrying the data operation, the steps of detecting a data error and obtaining a vibration status are repeated.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

Figure 1:
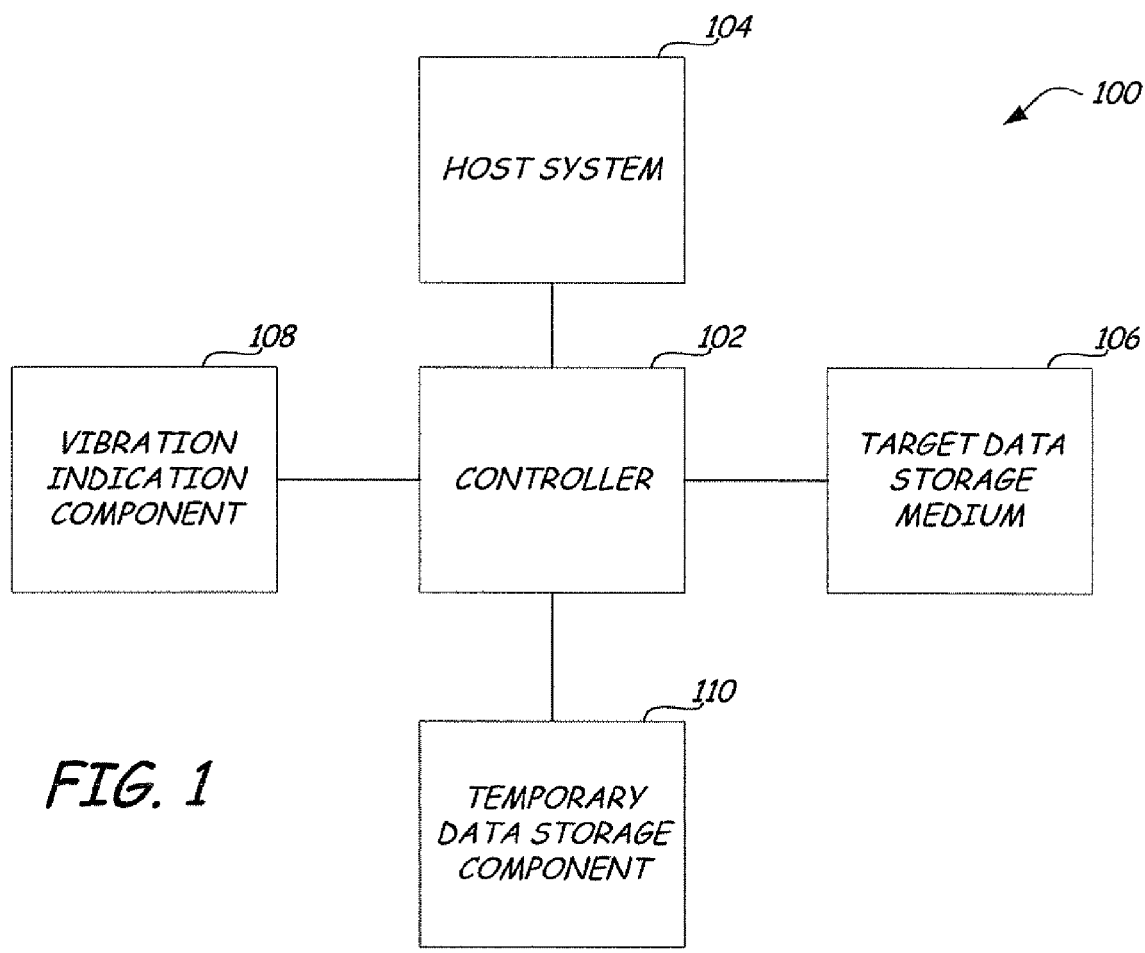
FIG. 1 is a schematic diagram of one embodiment of a data storage system.

FIG. 1 is a schematic diagram illustrating one embodiment of a data storage system 100. One or more of the elements shown in FIG. 1 can be implemented as part of data storage system 100 or externally to data storage system 100. System 100 includes a controller 102 configured to control certain operations of data storage system 100 in a known manner.

Controller 102 is communicatively coupled to a host device or system 104 and is configured to transmit, receive, access, and/or process data within system 100. For example, controller 102 can communicate data with one or more devices, components, applications, and/or subsystems of system 100 such as, but not limited to, a transmitter, receiver, data storage device, format conversion device, encoder (compressor), decoder (decompressor), buffer, multiplexor, or modulator. In the illustrated embodiment, controller 102 is configured to receive data from host system 104 and provide the data to be stored on target data storage medium 106. Further, controller 102 is configured to access target data storage medium 106 to retrieve data stored on medium 106. Controller 102 can provide the retrieved data to host system 104 and/or other components of system 100. Controller 102 can also be configured, if desired, to perform seek operations to locate desired portions of storage medium 106. For example, controller 102 can include a servo controller configured to seek a read/write head to a desired track of storage medium 106.

Target data storage medium 106 can include any type of storage medium configured to store data, including solid-state media and non-solid state media. For example, storage medium 106 can include a hard disc, floppy and/or removable disc, random access memory (RAM), magnetoresistive random access memory (MRAM), dynamic random access memory (DRAM), electrically erasable programmable read-only memory (EEPROM), a flash memory drive, and/or any other type of storage device. In one embodiment, storage medium 106 includes one or more hard discs, such as magnetic and/or optical discs.

During manufacture and/or operation, portions of data storage medium 106 can become defective. For example, one or more sectors of data storage medium 106 can experience grown defects. To accommodate defective sectors, controller 102 can be configured to perform data reallocation or reassignment. For instance, a number of spare sectors (memory locations) can be provided on target storage medium 106 and can be utilized to replace the defective sectors encountered during operation.

Further, in the illustrated embodiment system 100 can include a temporary data storage component 110 configured to store data. Controller 102 is communicatively coupled to temporary data storage component 110 and is configured to send data to and receive data from component 110. In one embodiment, temporary data storage component 110 is utilized to store data temporarily within system 100. For example, component 110 can be used as a buffer for storing data to be written to target data storage medium 106. In one embodiment, controller 102 is configured to implement a temporary data reassignment such that data to be written to target data storage medium 106 is temporarily stored in component 110.

Examples of temporary data storage component 110 include both solid-state media and non-solid state media. For example, temporary data storage component 110 can include a hard disc, floppy and/or removable disc, random access memory (RAM), magnetoresistive random access memory (MRAM), electrically erasable programmable read-only memory (EEPROM), a flash memory drive, and/or any other type of storage device. As illustrated, data storage component 110 can be separate from target storage medium 106. Alternatively, all or part of component 110 can be included within target storage medium 106.

In some embodiments, system 100 is employed in an environment in which data storage medium 106 can frequently be exposed to momentary shock and vibrations due to the portability and/or functionality of the environment in which it is located. For example, data storage medium 106 can be provided in a consumer electronic device, such as, but not limited to, portable electronic devices, digital music players, mobile phones, personal data assistants, etc.

In some instances, a momentary shock or vibration can cause a data error during a data write (or read) operation to target storage medium 106. In the illustrated embodiment, system 100 can also include a vibration indication component 108 configured to provide a signal indicative of a vibration condition to controller 102. For example, vibration indication component 108 can include a shock detection circuit configured to provide a signal indicative of a vibration amplitude. Further, vibration indication component 108 can also be configured to provide servo error code associated with a write and/or read operation. For example, a position error signal (PES) can be generated which gives an indication of the radial position of a read/write head with respect to particular tracks on storage medium 106. A position error signal (PES) that is above a threshold amplitude or has some known characteristic can indicate the presence of a vibration during a data operation.

Figure 2:
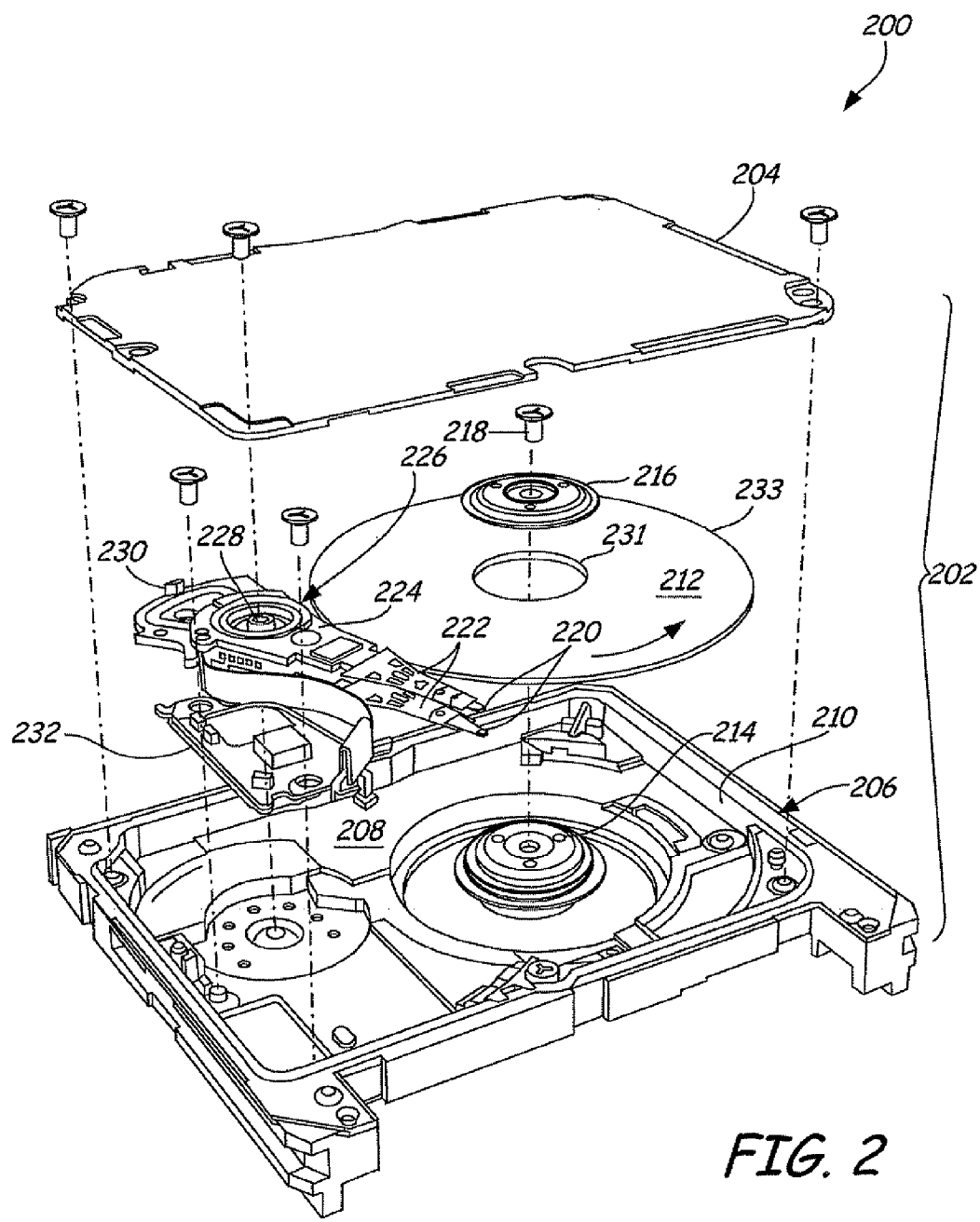
FIG. 2 is an exploded perspective view of one embodiment of a disc drive.
Figure 3:
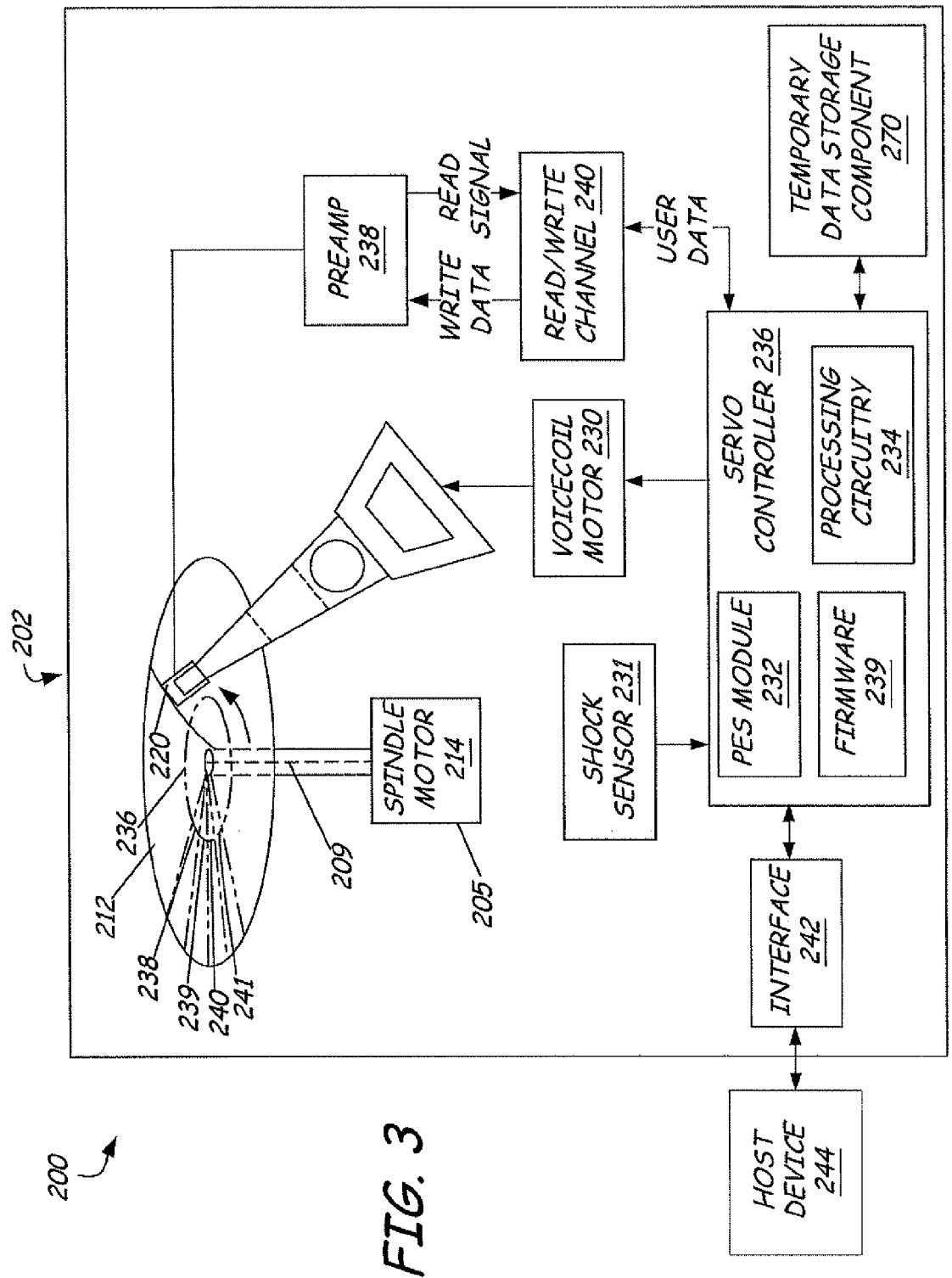
FIG. 3 illustrates a schematic diagram of the disc drive illustrated in FIG. 3.

FIGS. 2 and 3 illustrate one particular embodiment of a data storage system 200 having a rotatable data storage medium. As illustrated, data storage system 200 includes a disc drive. However, one or more embodiments of the present disclosure are also useful in other types of data storage systems.

As shown in FIG. 2, data storage system 200 includes a housing 202 having a cover 204 and a base 206. As shown, cover 204 attaches to base 206 to form an enclosure 208 enclosed by a perimeter wall 210 of base 206. The components of data storage system 200 are assembled to base 206 and are enclosed in enclosure 208 of housing 202. As shown, disc drive 200 includes a disc or storage medium 212. Although FIG. 2 illustrates storage medium 212 as a single disc, those skilled in the art should understand that more than one disc can be used in data storage system 200. Storage medium 212 stores information in a plurality of circular, concentric data tracks which are further subdivided into data sectors. Storage medium 212 is mounted on a spindle motor assembly 214 by a disc clamp 216 and pin 218. Spindle motor assembly 214 rotates medium 212 causing its data surfaces to pass under respective hydrodynamic bearing slider surfaces. Each surface of medium 212 has an associated slider 220, which carries transducers that communicate with the surface of the medium. The slider and transducers are often together referred to as a read/write head.

In the example shown in FIG. 2, sliders 220 are supported by suspension assemblies 222, which are, in turn, attached to track accessing arms 224 of an actuator mechanism 226. Actuator mechanism 226 is rotated about a shaft 228 by a voice coil motor 230, which is controlled by servo control circuitry within internal circuit 232. Voice coil motor 230 rotates actuator mechanism 226 to position sliders 220 relative to desired data tracks, between a disc inner diameter 231 and a disc outer diameter 233.

FIG. 3 is a simplified block diagram of data storage system 200 illustrated in FIG. 2 having housing 202. Data storage system 200 includes a controller 236 and processing circuitry 234 used for controlling certain operations of data storage system 200 in a known manner.

Data storage system 200 can include a preamplifier (preamp) 238 for generating a write signal applied to sliders 220 during a write operation, and for amplifying a read signal emanating from slider 220 during a read operation. A read/write channel 240 receives data from processing circuitry 234 during a write operation, and provides encoded write data to preamplifier 238. During a read operation, read/write channel 240 processes a read signal generated by preamp 238 in order to detect and decode data recorded on medium 212. The decoded data is provided to processing circuitry 234 and ultimately through interface 242 to a host device 244.

As illustrated, storage medium 212 is logically divided into a plurality of data segments. An example data track 236 and example data segments 238-241 are illustrated in FIG. 3. In general, data segments 238-241 are considered to be data sectors for storage of user data. However, data segments 238-241 can also be considered data wedges. Data wedges can span across more than one data sector as well as include partial data sectors.

Data storage system 200 includes servo controller 236 which generates control signals applied to VCM 230 and spindle motor 214. Processing circuitry 234 instructs servo controller 236 to move read/write head 220 to desired tracks. Servo controller 236 is also responsive to servo data, such as servo burst information recorded on medium 212 in embedded servo fields or servo wedges included in the data tracks. Both track seeking and track following operations typically include generation of a position error signal (PES) by PES module 232 which gives an indication of the radial position of the read/write head with respect to the tracks on the disc. In high performance disc drives, the PES is derived from either a prerecorded servo disc with a corresponding servo head (a dedicated servo system), or from servo information that is embedded on each recording surface among user data blocks at predetermined intervals (an embedded servo system). The read/write head provides the servo information to the servo control circuitry which generates the PES with a magnitude that is typically equal to zero when the head is positioned over the center of the track ("on track"), and is linearly proportional to a relative off-track distance between the head and the center of the track.

Further, data storage system 200 includes one or more vibration detection components which provide an indication of a vibration condition of system 200. For example, a shock detection circuit can be provided that determines whether a disturbance (e.g., shock, vibration, etc.) exceeds a threshold amplitude. In the illustrated embodiment, a shock sensor 231 is provided and is configured to generate a shock output signal if a vibration amplitude of an observed disturbance exceeds a threshold level. The shock output signal can simply represent whether the vibration amplitude exceeds the threshold or can indicate the level of vibration. Shock sensor 231 communicates the shock output signal to controller 236. Controller 236 can be configured to control operation of the data storage system 200 based on the signal from the shock sensor 231. For example, if the signal from the shock sensor 231 indicates a vibration amplitude level that exceeds a threshold level, a write and/or read operation of system 200 can be block or suspended. Further, controller 236 can be configured to implement a retry of a blocked or suspended data operation.

Further, a vibration detection component can include a component configured to check a servo error code associated with a data operation. For example, a position error signal (PES) module 232 can be configured to generate a PES during a write operation. The PES gives an indication of the radial position of a read/write head with respect to particular tracks on storage medium 212. The PES can be utilized to indicate vibration within data storage system 200. For example, controller 236 can be configured to detect when the PES deviation exceeds a threshold value and, in response, control a data operation within system 200. For example, controller 236 can cause at least a portion of the write operation to be blocked based on the PES generated by PES module 232.

Further yet, a vibration detection component can include a component configured to receive an indication of a vibration condition from host 244. Host 244 is communicatively coupled to controller 236 via interface 242. In some embodiments host device 244 can be configured to implement a component (not shown in FIG. 3) that includes a source of vibration or shock. For instance, in the context of a consumer electronic device host device 244 can be configured to active a component, such as a vibrator, ringer, and/or speaker, that generates a vibration within system 200. Host 244 can provide an indication that a source of vibration is about to be activated. Controller 236 can be configured to control data operations (e.g., data read and/or write operations) based on vibration indications received from host device 244.

Sometimes, data segments can become defective or "bad" during normal operation of data storage system 200. For instance, during operation of system 200 one or more segments (e.g., sectors 238-241) on medium 212 can be determined to contain a media defect. For example, segments of medium 212 can experience grown defects which include, for example, invading foreign particles which become embedded onto the surface of the disc, or external shocks to the storage system which can cause the transducer to nick or crash onto the surface of the disc. Such media defects pose either temporary or permanent data retrieval problems.

In accordance with some embodiments, to accommodate defective segments controller 236 and/or processing circuitry 234 can be configured to carry out a reallocation or reassignment of data. For instance, storage medium 212 can include a reserve of spare segments for replacing the defective segments. If a defective segment is discovered, data in the defective segment is reassigned to a spare segment. The determination of the defectiveness of a segment is often determined during a write or read operation. For instance, during a data operation, such as a data write operation, controller 236 can encounter a data error. The controller 236 can implement a data retry in an attempt to correct the encountered data error. In another example, system 200 can be configured to perform a "mini-cert" operation in which a write verify is performed followed by a read operation to determine if the sector contains a media defect. If the system 200 determines that a media defect exists, the system 200 can perform a data reassignment to a spare sector of medium 212.

Further, as illustrated in FIG. 3 data storage system 200 can include a temporary data storage component 270. In one embodiment, temporary data storage component 270 is substantially similar to component 110 illustrated in FIG. 1. Examples of temporary data storage component 270 include both solid-state media and non-solid state media. For example, temporary data storage component 270 can include a hard disc, floppy and/or removable disc, random access memory (RAM), magnetoresistive random access memory (MRAM), electrically erasable programmable read-only memory (EEPROM), a flash memory drive, and/or any other type of storage device. As illustrated, data storage component 270 can be separate from storage medium 212. Further, while temporary data storage component 270 is illustrated within housing 202, it is noted that in other embodiments temporary data storage component 270 can be provided outside housing 202 and/or remote from data storage system 200. Temporary data storage component 270 is configured to provide one or more temporary data storage locations for storing data. For example, temporary data storage component 270 can operate as a cache or buffer memory for temporarily storing data provided by controller 236.

As discussed above, data storage system 200 illustrated in FIGS. 2 and 3 can be used, for example, in hand-held consumer electronic products, such as digital music players, cell phones, personal data assistants and etc. In such an environment, data storage system 200 can frequently be exposed to momentary shock and/or vibration events due to the portability of hand-held devices in which it is located. These vibrations and/or shock events can cause data errors during operation of system 200. For example, burst errors are types of error that data storage system 200 can experience. Further, vibrations and/or shock can cause the read/write head 220 to significantly deviate from a center of a desired track of medium 212 thus causing a data error in a data write operation to the desired track, for instance. In some instances, the vibration and/or shock can cause system 200 to determine incorrectly that one or more segments of medium 212 contain media defects. For example, vibration and/or momentary shock can cause a data storage system to identify sectors as containing media defects and implement a data reassignment to spare sectors of the storage medium even though the underlying media of the original sector is not defective. During a write operation, the data storage system 200 may reassign many of the data segments attempted to be written, and therefore consecutively reassign data segments that may not need to be reassigned because the underlying media of the data segments are not defective. This type of behavior is known as consecutive reassignment. Further, in cases where system 200 is exposed to vibration and/or shock for a prolonged period, data storage system 200 may attempt to repeatedly rewrite the same data to many different spare sectors. This type of behavior is known as repeated reassignment.

Repeated reassignment and reassignment of consecutive data segments can have many detrimental consequences. For example, repeatable reassignment and consecutive reassignment of data segments can vastly limit an amount of capacity that a data storage system can utilize. A data storage system can run out of precious spare data segment space. A repeated reassignment consumes at least one new spare data segment for each repeat. A disc drive that runs out of spare data segments is unable to handle new grown defects and functions abnormally. In another example, the host operations can time out. Each data segment in error can undergo a series of time-consuming defect tests before it is finally considered defective and is reassigned. Consecutive or repeated reassignment can significantly prolong write operations. In yet another example, a reassignment list or table associated with the spare sectors of medium 212 can grow rapidly and become full with repeated and consecutive reassignments. Consecutive reassignments generate many reassignment entries and although repeated reassignment generates only a single reassignment entry, each reassignment entry due to repeated reassignment occupies more space than a single entry because all previously used replacement segments must be recorded with the reassignment list such that previously used replacement segments will not be used as replacement segments again upon new reassigning. A full reassignment list renders a disc drive unable to handle new grown defects. Further, vibration and/or shock present at medium 212 during a data reassignment to medium 212 can cause a reassignment table failure in which an error occurs while writing data to the reassignment table.

Figure 4:
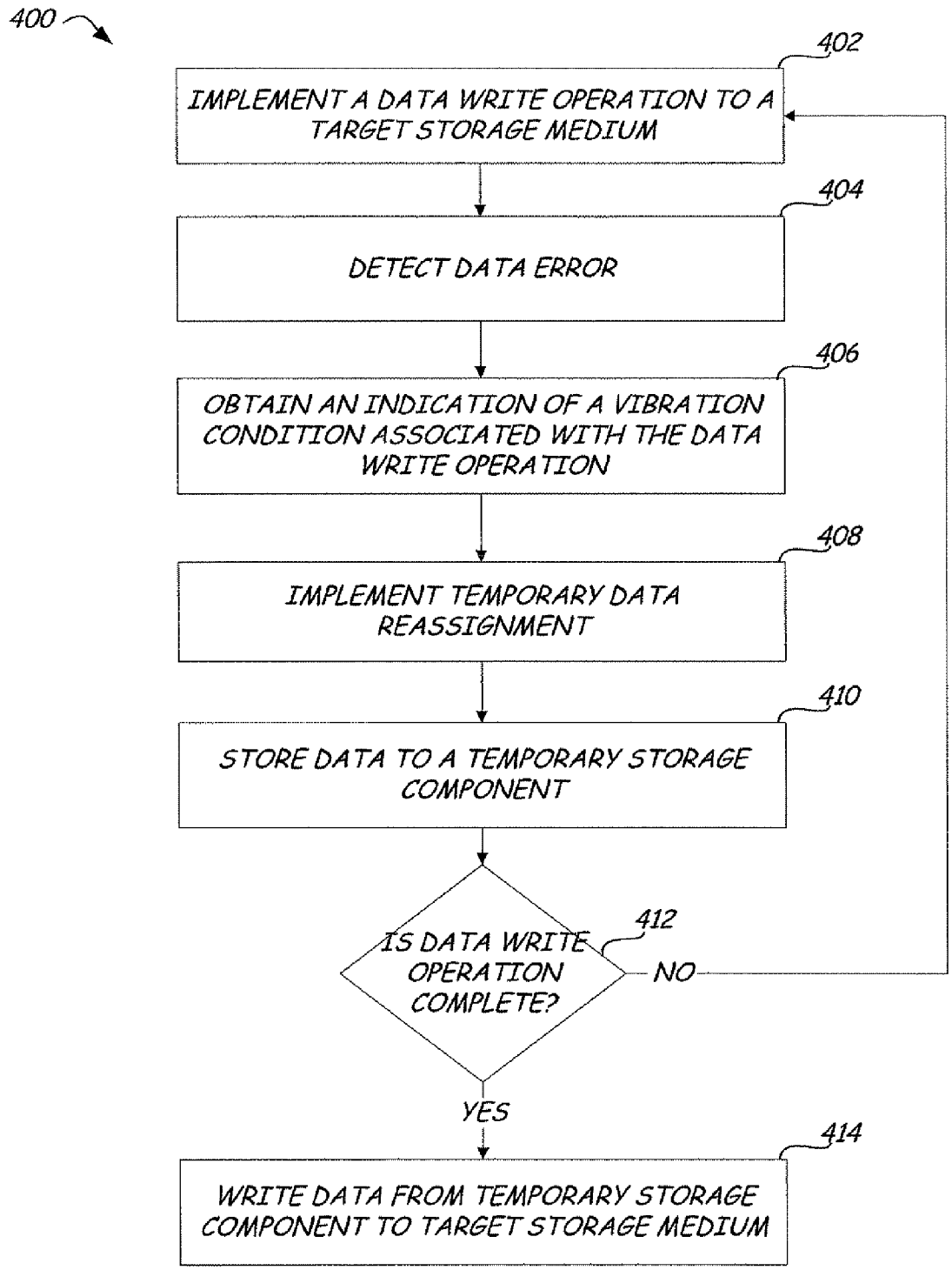
FIG. 4 is a flow diagram of a method of performing a data write operation in a data storage system

In accordance with one embodiment, processing circuitry, such as processing circuitry 234 (FIG. 3), handles write errors during write operations and limits, or prevents, false media defects, repeated reassignment of data segments, and/or consecutive reassignment of data segments. FIG. 4 illustrates a flow diagram of a method 400 of performing a data write operation in a data storage system, such as the data storage system illustrated in FIG. 3. While method 400 is described in the context of a data write operation, it is noted that the concepts described herein can be utilized in the context of other data operations including, but not limited to, data read operations, data processing operations, data transmit and receive operations, and data access operations.

At step 402, a data write operation is implemented. A data write operation includes writing data to one or more target locations (such as sectors) of a target storage medium, such as storage medium 212. During the write operation, a data error is encountered at step 404. As discussed above, a data error during a write operation can be caused by, for example, a media defect and/or misalignment of the read/write head over the storage medium. For instance, vibration and/or momentary shock can cause the read/write head to deviate from a desired position over a target track. The sectors of the target storage medium that are determined to contain data errors are referred to as error sectors.

At step 406, in response to the detected data error, an indication of a vibration condition present during the data write operation is obtained. The indication can include, for example, an output from shock detection circuit, such as shock sensor 231 and/or checking servo error code associated with the data write operation. For instance, a position error signal (PES) associated with the write operation can be checked. The servo error code or PES can provide evidence that a vibration was present during the data write operation.

At step 408, a temporary data reassignment is implemented based on the vibration condition indication obtained at step 406. For example, the temporary data reassignment can be implemented at step 408 if step 406 indicated that a significant vibration was present during the write operation to the error sector at step 402. In the illustrated embodiment, the temporary data reassignment includes storing the data from the write attempt at step 402 to a temporary data storage location at step 410. For example, data can be stored to a temporary data storage location in a temporary data storage component, such as component 270 illustrated in FIG. 3. As discussed above, temporary data storage component 270 can be positioned within the same housing as the target storage medium (i.e., medium 212) or can be positioned remote from the target storage medium. In either case, the temporary data storage location can also be exposed to momentary shock and/or vibration during a data write (or read) operation to the temporary data storage location. In one embodiment, the temporary data storage location is configured such that a write (or read) operation of data to the temporary data storage location is less susceptible to data errors caused by vibration than a write operation of data to the target storage medium. For example, in one embodiment the temporary data storage location can include solid-state memory such as, but not limited to, flash memory.

After the data from the error sector is written to the temporary storage location at step 410, the method continues to decision block 412 wherein the method determines if the write operation has completed. For instance, the method returns to step 402 and continues to write data to any remaining sectors of the target storage medium. If block 412 determines that the write operation has completed, the method 400 proceeds to step 414 wherein data stored on the temporary storage component is written back the target storage medium. In one embodiment, data is written from the temporary storage component to the target storage medium after the vibration condition has terminated and/or when the data storage system is idle. The data can be written back to the original error sectors of the target storage medium or can be written to a spare sector of the target storage medium.

Figure 5:
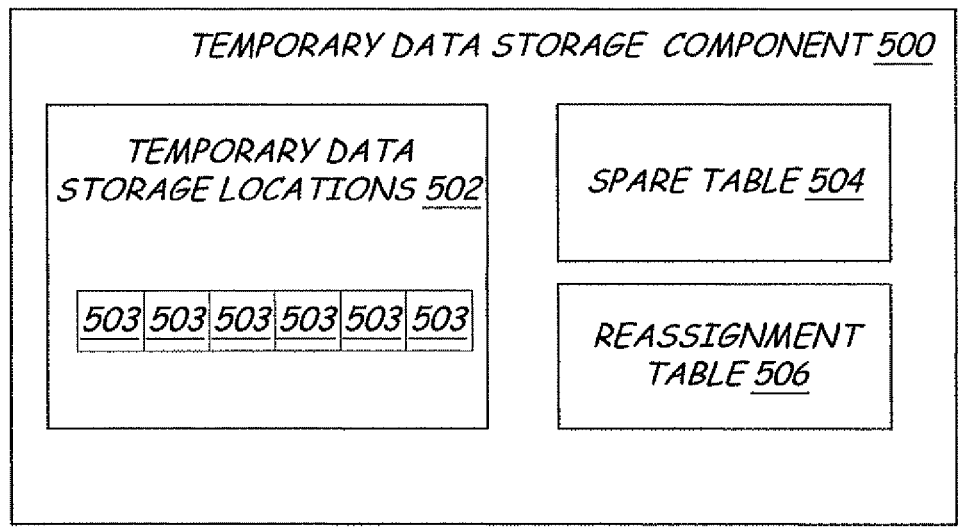
FIG. 5 is a schematic diagram of one embodiment of a temporary data storage component.

FIG. 5 illustrates one embodiment of a temporary data storage component 500. Component 500 is one example of a temporary data storage component that can be utilized in system 200. Component 500 includes a temporary data store 502 comprising one or more storage locations 503. For instance, locations 503 can include sectors or segments of a storage medium, including solid-state and/or non-solid state storage media. Examples of temporary data storage component 500 include a hard disc, floppy and/or removable disc, random access memory (RAM), magnetoresistive random access memory (MRAM), dynamic random access memory (DRAM), electrically erasable programmable read-only memory (EEPROM), a flash memory drive, and/or any other type of storage device.

Figure 6:
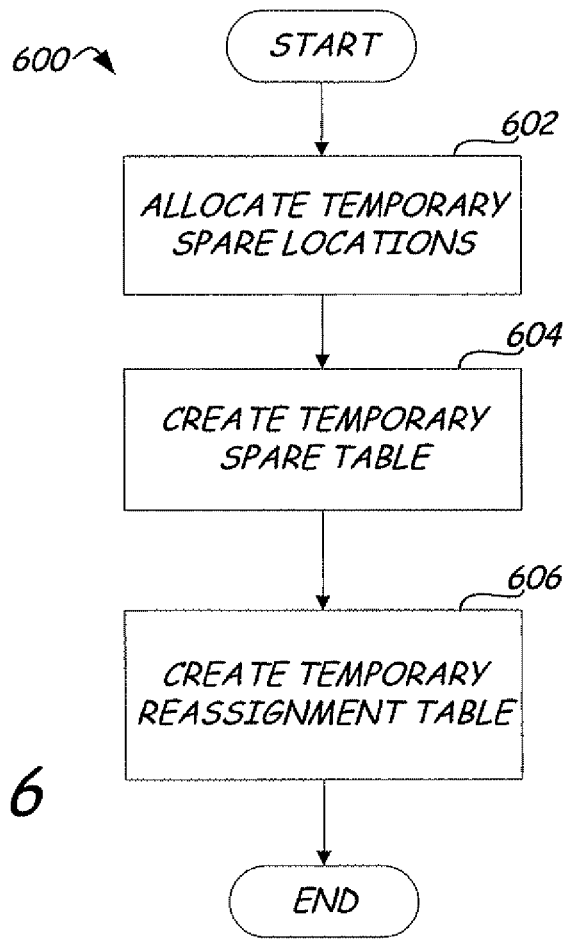
FIG. 6 illustrates a method for creating the temporary data storage component of FIG. 5.

Temporary data storage component 500 also includes a spare table 504 and a temporary data reassignment table 506. Although illustrated as residing within component 500, one or more of spare table 504 and reassignment table 506 can be external to component 500. Spare table 504 includes information relating to the available spare locations 503 and/or their physical location within temporary data storage component 500. Further, temporary data reassignment table 506 includes entries that map temporary data storage locations 503 to error sector of a target storage medium (i.e. medium 212) for which data is stored in component 500. FIG. 6 illustrates a method 600 for establishing temporary data storage component 500. At step 602, temporary spare locations 503 are allocated within temporary data storage component 500. At step 604, temporary spare table 504 is created in temporary data storage component 500. At step 606, the temporary reassignment table 506 is created.

Figure 7:
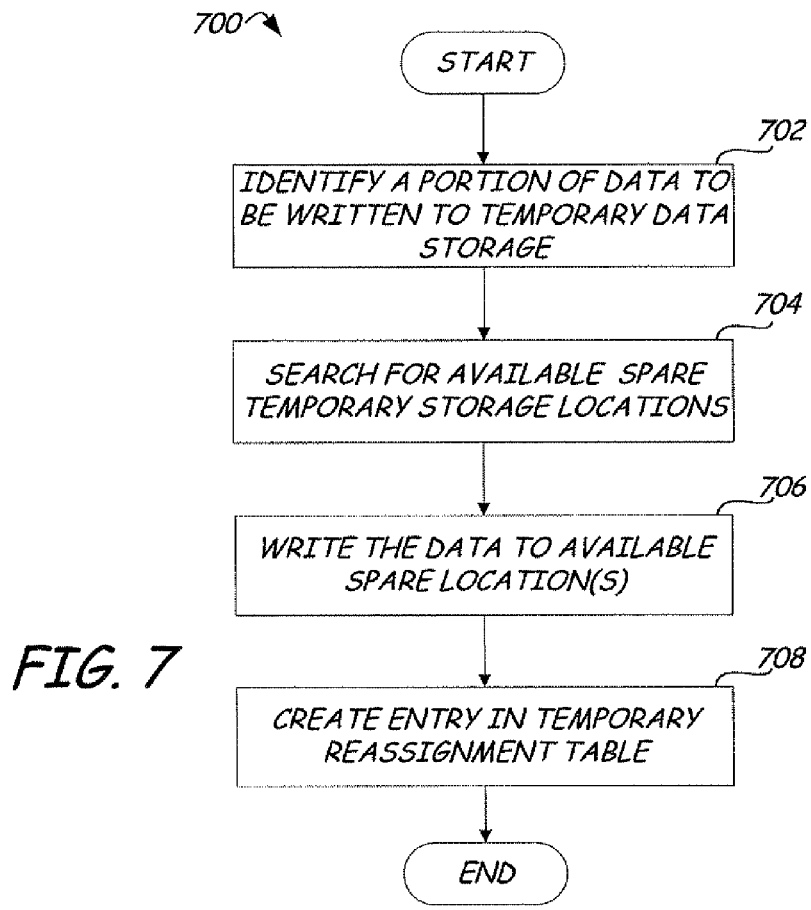
FIG. 7 illustrates one embodiment of a method for storing data in a temporary data storage component.

FIG. 7 illustrates one embodiment of a method 700 for storing data in temporary data storage component 500. In one embodiment, method 700 is implemented by controller 236 illustrated in FIG. 3. Further, in one example method 700 is utilized for storing data at step 410 illustrated in FIG. 4.

Method 700 begins at step 702 wherein a portion of data is identified to be written to temporary storage component 500. For example, a portion of data from an error sector of a target storage medium, for example medium 212, is identified. At step 704, temporary data storage component 500 is searched to determine an availability of one or more storage locations 503. In one embodiment, spare table 504 is accessed to determine the physical locations of the storage locations 503 in component 500. For example, step 704 can determine whether a sufficient number of segments or sectors in store 502 are available to store the portion of data identified at step 702. If a number of store locations 503 necessary to store the portion of data are determined to be available, the method stores the data to one or more storage locations 503 at step 706. Then, an entry is created in the temporary reassignment table 506 that maps the one or more storage locations 503 to corresponding error sectors of the target storage medium. The entries in spare table 504 and/or temporary reassignment table 506 can be later utilized in retrieving stored data from component 500.

Figure 8:
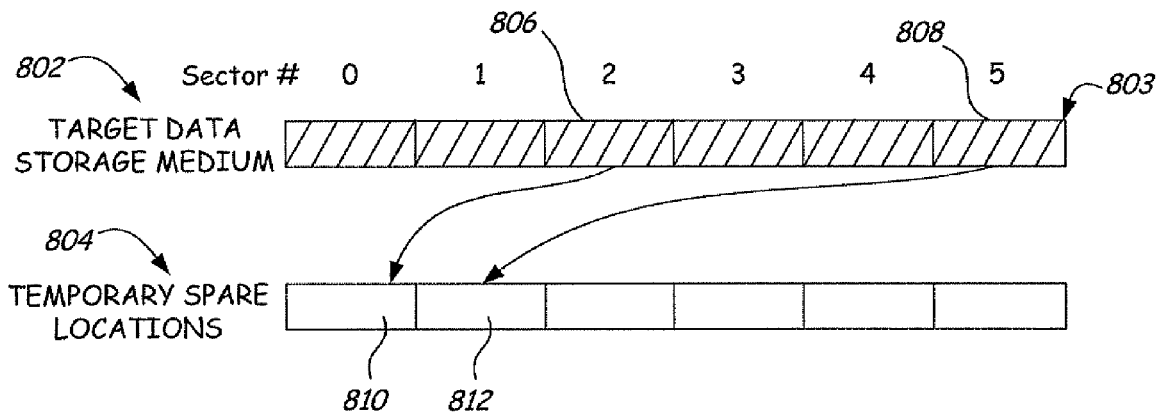
FIG. 8 is a schematic diagram illustrating portions of an exemplary target storage medium and a temporary data storage component.

To further illustrate method 700, FIG. 8 is a schematic diagram illustrating a portion of an exemplary target storage medium 802, such as storage medium 212. Target data storage medium 802 includes one or more sectors 803 to which data is written during a data operation. FIG. 8 also illustrates a plurality of temporary data storage locations (i.e., spares) 804 of a temporary data storage component (i.e. component 500).

As illustrated, data is written to sectors 803 in a sequential manner wherein data is first written to sectors 0 and 1 of medium 802. During the write operation to sectors 806 (i.e., sector 2), a data error is encountered. A temporary data reassignment is implemented wherein the data from the write attempt to sector 806 is temporarily stored in a portion 810 of temporary data storage locations 804. Upon writing the data to portion 810, an entry is created in a temporary reassignment table (i.e. table 506). The entry includes data that maps portion 810 to error sector 806. Next, the data write operations continues such that data is written to sectors 3 and 4 of medium 802. At sector 808, a data error is encountered. A temporary data reassignment is implemented wherein the data from the write attempt to sector 808 is stored in a portion 812 of temporary data storage locations 804. Upon writing the data to portion 812, an entry is created in the temporary reassignment table. The entry includes data that maps portion 812 to error sector 808.

Figure 9:
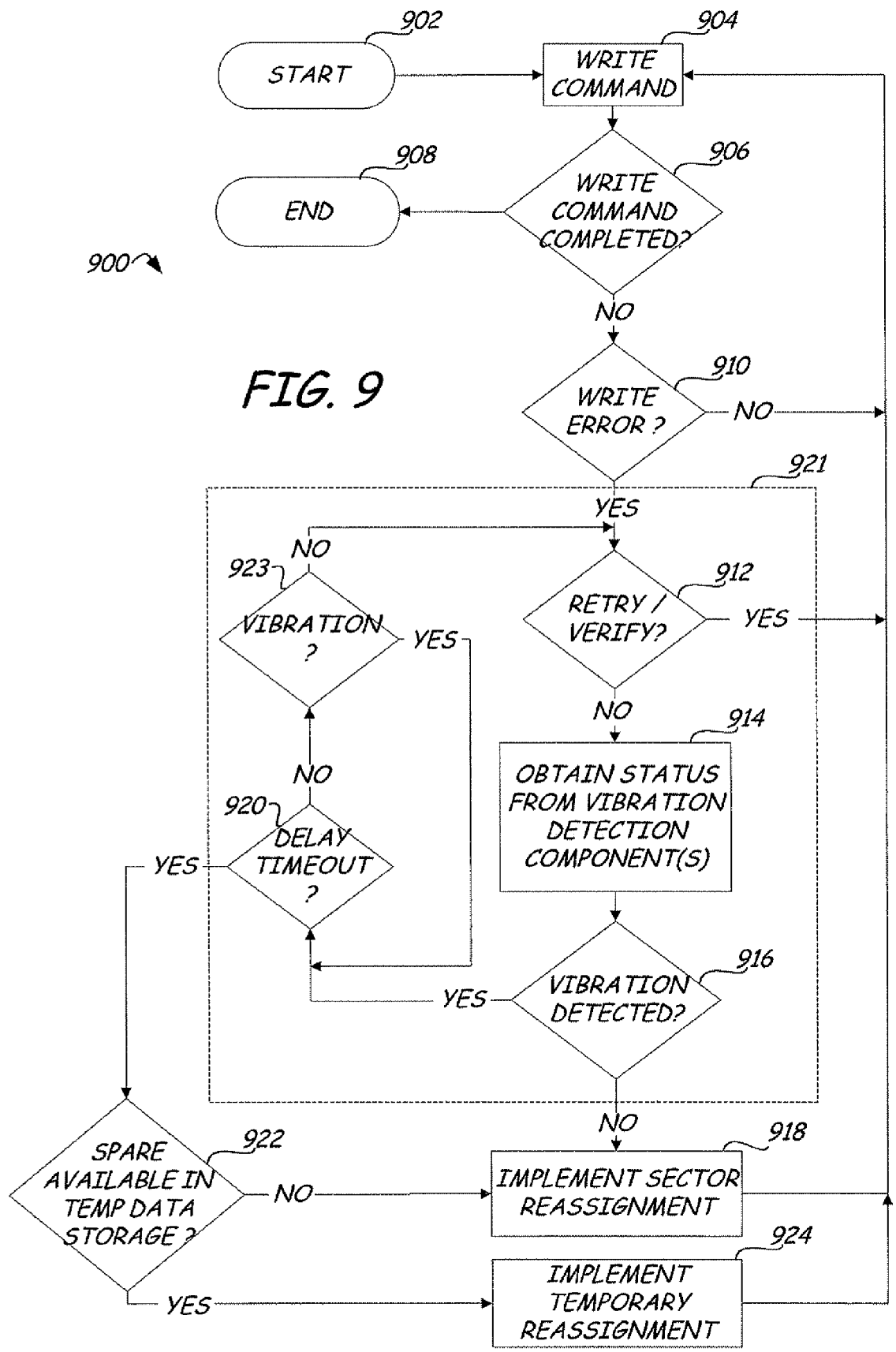
FIG. 9 illustrates one embodiment of a method for performing a temporary data reassignment including a retry loop.

FIG. 9 illustrates one embodiment of a method 900 for performing a temporary data reassignment including a retry loop 921. Method 900 will be described below in the context of data storage system 200, illustrated in FIG. 2. However, the concepts described below can be implemented in other data storage system types and configurations.

Method 900 begins at block 902 and a write command is performed at step 904. The write command can include writing data to one or more target sectors of a target storage medium (i.e., medium 212). At block 906, if the write command is completed, method 900 ends at block 908. If the write command is not completed, the method continues to decision block 910 wherein a portion of data is written to a sector of the target storage medium. Block 910 determines whether a write error was encountered during the write operation. If a write error was not encountered, the method 900 returns to block 904 wherein the write command continues for any remaining sectors.

If decision block 910 determines that a write error was encountered during the write operation, the method continues to decision block 912 wherein the write error is verified. For example, a write retry operation can be performed. If the error has cleared, the method returns to block 904. If the write error has not cleared, the method continues to block 914 wherein a vibration condition status is obtained from one or more vibration detection components. The vibration condition status can indicate whether a significant vibration was present at the storage system during the write operation. For example, step 914 can include receiving a signal from a shock detection circuit, such as shock sensor 231. The shock detection circuit provides a signal indicative of an amplitude of an observed vibration, for example. Further, step 914 can include checking a servo error code. As discussed above, a position error signal (PES) associated with the write operation can be checked to determine if the PES exceeded a threshold value during the write operation.

At step 916, the method determines whether a vibration was detected at block 914. If a vibration was not detected, the method continues to block 918 wherein a conventional sector reassignment is implemented. For example, in one embodiment step 918 includes replacing the defective sector with a spare sector provided on target data storage medium 212.

If a vibration is detected at decision block 916, the method 900 determines at decision block 920 whether the vibration condition has exceeded a pre-determined threshold duration. If a threshold duration has not been exceeded, retry loop 921 returns to block 912 wherein the method 900 determines whether the error has cleared. It is noted that retry loop 921 can also include an optional decision block 923 that determines if an amplitude of the vibration has fallen to a acceptable level before performing a write retry/verify at step 912. In one embodiment, step 923 is substantially similar to steps 914 and 916.

Upon returning to step 912, a data write retry and/or verify can be implemented to determine if the write command can be successfully completed. If the error has not cleared at block 912, loop 921 continues to blocks 914 and 916 to determine a vibration condition status. As illustrated, loop 921 generally indicates a delayed reassignment loop that repeatedly retries the write operation and detects vibration.

If loop 921 exceeds a threshold duration, decision block 920 implements a delay timeout wherein the method 900 proceeds to step 922. Step 922 determines whether a spare data storage location is available on a temporary data storage component, such as component 500 illustrated in FIG. 5. For example, decision block 922 determines whether a spare location is available in the temporary data storage component. If a temporary data storage location is not available, the method 900 continues to step 918 wherein the error sector is reassigned to a spare sector associated with the target storage medium (i.e., medium 212). In this manner, the data from the error sector is stored to a spare sector on the target storage medium. If a temporary data storage location is available at step 922, the method 900 implements a temporary data reassignment that includes storing the data from the error sector to a temporary storage location at step 924. In one embodiment, step 924 implements method 700 illustrated in FIG. 7.

After the data is written to a spare sector on target storage medium (step 918) or to a temporary storage location (step 924), the method 900 proceeds to step 904 wherein the write command is continued for any remaining sectors.

Figure 10:
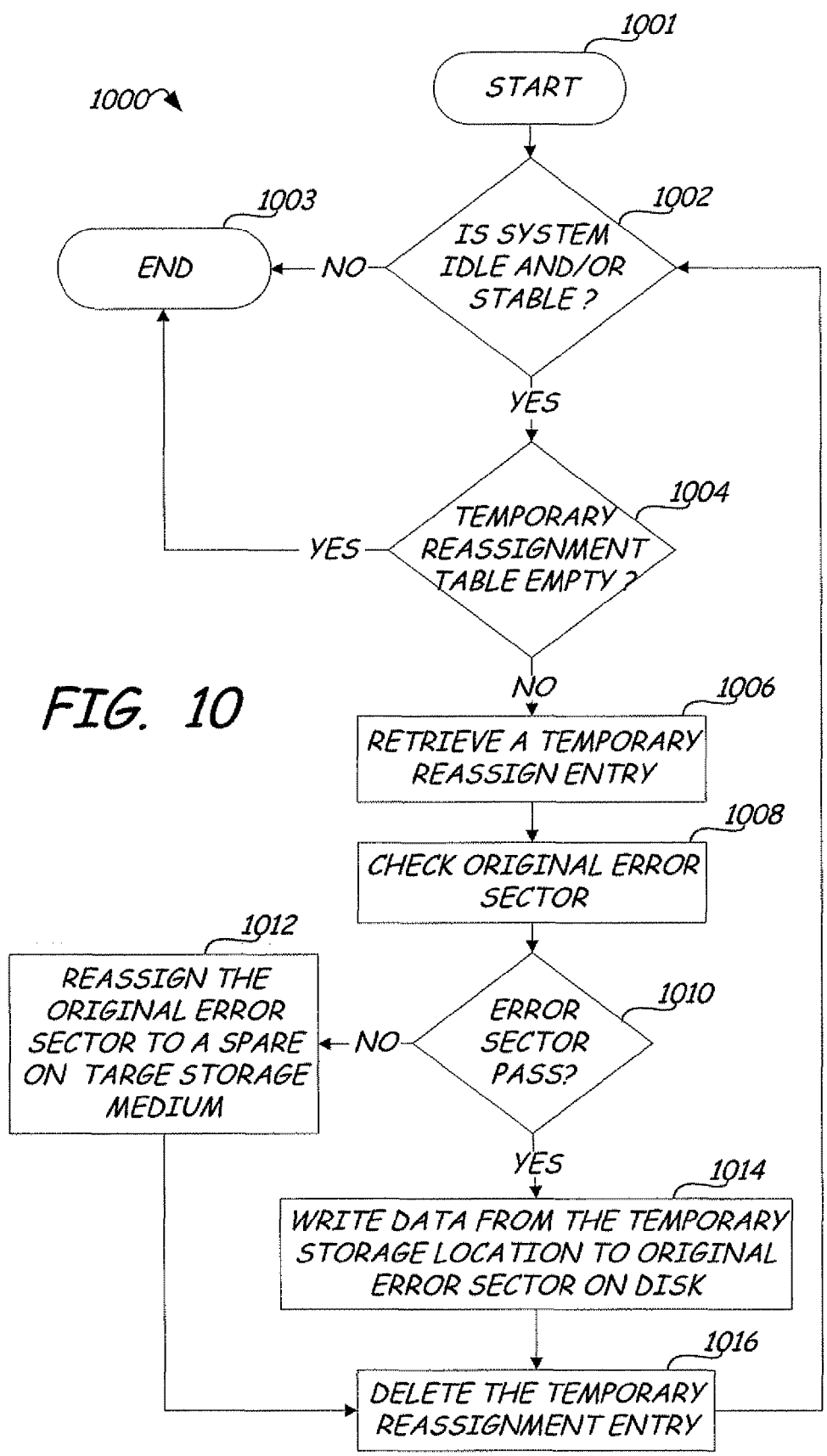
FIG. 10 illustrates one embodiment of a method for writing data stored in a temporary data storage component to a target storage medium.

FIG. 10 illustrates a method 1000 for writing data stored in the temporary data storage component 500 back to the target storage medium (i.e. medium 212). The method begins at block 1001. At step 1002, the method 1000 determines whether the data storage system is stable and/or idle. For example, step 1002 determines whether the data storage system is currently performing a data write or read operation, and/or whether a vibration is present at the storage system. If the system is not sufficiently idle and/or stable, the method ends at block 1003. If the system is determined to be stable, the method 1000 proceeds to decision block 1004 wherein the temporary reassignment table is checked to determine if the table contains at least one entry mapping data stored in the temporary storage component. If the temporary reassignment table is empty, the method 1000 proceeds to block 1003 wherein the method terminates.

If the reassignment table is not empty, the method 1000 proceeds to step 1006 wherein one or more of the temporary reassignment entries in the reassignment table are retrieved. As discussed above, entries in the reassignment table can contain information mapping data stored in the temporary storage locations to original error sectors on the target storage medium. At block 1008, the original error sectors on the target storage medium are checked to determine whether the error sectors contain a media defect. For example, step 1008 can include a write and/or read verify.

At decision block 1010, if the original error sector is determined to contain a media defect the method proceeds to block 1012 wherein the error sector is reassigned to a spare sector on the target storage medium. If the error sector passes the test at step 1010, data is written from the temporary storage component to the original sector on the disk. Following a successful write of data at steps 1012 or 1014, the temporary reassignment entry is deleted from the temporary reassignment table at step 1016 and the method returns to block 1002.

It is to be understood that even though numerous characteristics and advantages of various examples have been set forth in the foregoing description, together with details of the structure and function of various embodiments, this disclosure is illustrative only, and changes may be made in detail, especially in matter of structure and arrangement of parts within the principles of the disclosure to the full extent indicated by the broad general meaning of the terms in which the appended claims are expressed. For example, the particular elements may vary depending on the particular application for data sector reassignment while maintaining substantially the same functionality without departing from the scope of the disclosure and/or the appended claims. In addition, although examples described herein are directed to a data storage system for non-volatile storage of data, it will be appreciated by those skilled in the art that the teaching of the disclosure can be applied to the correction of errors in volatile memory or dynamic memory, without departing from the scope of the disclosure and/or claims.

What is claimed is:

1. A method of performing a data operation, the method comprising:
    detecting a data write error associated with a data write operation for a portion of data to one or more target storage locations of a first, target storage medium; and
    implementing a delayed data reassignment mode for the portion of data comprising:
        verifying the data write error after a time delay and obtaining an indication of a vibration condition associated with the data write error; and
        implementing a temporary data reassignment by storing the portion of data to one or more storage locations of a second storage medium based on verification of the data write error and based on a determination that the vibration condition exceeds a threshold duration.

2. The method of claim 1, wherein storing the portion of data to one or more storage locations of the second storage medium includes writing the portion of data to a solid-state memory device.

3. The method of claim 1, wherein the second storage medium is separate from the target storage medium, and wherein obtaining an indication of the vibration condition comprises receiving a signal from a vibration detection component.

4. The method of claim 3, wherein obtaining the indication of the vibration condition includes obtaining a status of a shock sensor and a servo error code associated with the data write operation to the target storage medium.

5. The method of claim 1, wherein the delayed data reassignment mode includes a reassignment process loop comprising:
    a) imposing a time delay;
    b) determining if the data write error cleared after the time delay by implementing a subsequent data write operation to the one or more target storage locations;
    c) receiving a vibration status from a vibration detection component indicative of a vibration condition during the subsequent data write operation;
    d) repeating steps a) to c) until a loop exit condition is satisfied.

6. The method of claim 5, wherein the loop exit condition comprises at least one of a total time delay exceeding a threshold, receiving a vibration status that indicates a vibration did not occur during the subsequent data write operation, and determining that the data write error cleared after the time delay.

7. The method of claim 1, wherein implementing the temporary data reassignment comprises:
    creating an entry in a reassignment table associated with the second storage medium, wherein the entry maps the one or more target storage locations to the one or more storage locations of the second storage medium.

8. The method of claim 1, wherein implementing the temporary data reassignment comprises:
   determining that the vibration condition has terminated; and
   in response to the determination, performing an operation to determine whether the one or more target storage locations are considered to contain one or more media defects.

9. The method of claim 8, comprising attempting to rewrite the portion of data to the one or more target storage locations.

10. The method of claim 9, and further comprising:
    detecting a data error during the re-write; and
    writing the portion of data to one or more spare storage locations associated with the target storage medium based on whether a data error was detected during the re-write.

11. The method of claim 1, wherein implementing the temporary data reassignment comprises reassigning the one or more target storage locations to the one or more data storage locations of the second storage medium for a period of time that is defined at least in part by a determination that the vibration condition has terminated.

12. A method comprising:
    detecting a data error associated with a data write operation of a portion of data to one or more sectors of a first, target storage medium;
    obtaining a vibration status from a vibration detection component, the vibration status being indicative of a vibration that occurred during the data write operation;
    in response to the detected data error, and based on the vibration status, retrying the data write operation;
    in response to retrying the data write operation, repeating the steps of detecting a data error associated with the data write operation and obtaining a vibration status; and
    implementing a temporary data reassignment comprising storing the portion of data to one or more storage locations of a second storage medium if the steps of obtaining the vibration status indicate a vibration duration that exceeds a threshold duration.

13. The method of claim 12, wherein obtaining a vibration status comprises obtaining a status of a shock sensor and servo error code associated with the data write operation.

14. The method of claim 12, wherein implementing the temporary data reassignment comprises:
    determining whether a storage location in a temporary data storage component is available, wherein the temporary data storage component includes a solid-state memory device;
    writing the portion of data to the temporary data storage component if a storage location is available; and
    creating an entry in a reassignment table associated with the temporary data storage component, wherein the entry includes information that maps the target sector to one or more storage locations in the temporary data storage component.

15. A data storage system comprising:
    a first, target storage medium;
    a second storage medium that is separate from the target storage medium;
    a vibration detection component; and
    a controller configured to:
       implement a first data write operation of a portion of data to one or more target storage locations of the target storage medium and detect a data error associated with the first data write operation;
       based on the detected data error and an indication of a vibration condition that occurred during the data write operation, implement a data reassignment operation that stores the portion of data to one or more data storage locations of the second storage medium; and
       after the vibration condition has terminated, perform an operation to determine whether the one or more target storage locations are considered to contain one or more media defects, access the one or more data storage locations of the second storage medium and perform a second data write operation of the portion of data to the one or more target storage locations of the target storage medium, and reassign the one or more target storage locations to one or more spare storage locations if the one or more target storage locations are considered to contain one or more media defects.

16. The system of claim 15, wherein the controller is configured to perform one or more iterations of implementing a retry of the first data write operation to the one or more target storage locations after a time delay and obtaining an indication of a vibration condition associated with the retry, wherein the controller is configured to implement the data reassignment operation if a threshold delay timeout period is reached.

17. The system of claim 15, wherein the controller is configured to allocate the one or more data storage locations of the second storage medium for data storage during a subsequent data reassignment operation for a portion of data associated with a subsequent data write operation to the target storage medium.

18. The system of claim 15, wherein the controller is configured to implement the data reassignment operation to temporarily reassign the one or more target storage locations to the one or more data storage locations of the second storage medium for a period of time that is defined at least in part by a determination that the vibration condition has terminated.

19. The system of claim 15, wherein the first storage medium comprises non-solid-state memory and the second storage medium comprises solid-state memory.

\* \* \* \* \*